United States Patent [19]

Hemme

[11] Patent Number: 5,239,608
[45] Date of Patent: Aug. 24, 1993

[54] MAGNETO-OPTICAL WAVEGUIDE

[75] Inventor: Heinrich Hemme, Hamburg, Fed. Rep. of Germany

[73] Assignee: U.S. Philips Corp., New York, N.Y.

[21] Appl. No.: 446,496

[22] Filed: Dec. 4, 1989

[30] Foreign Application Priority Data

Dec. 16, 1988 [DE] Fed. Rep. of Germany ....... 3842408

[51] Int. Cl.$^5$ .............................................. G02B 6/10
[52] U.S. Cl. ..................................... 385/131; 385/129; 385/130; 385/6; 427/164; 427/407.1
[58] Field of Search ........................... 350/96.12, 96.13; 385/1, 4, 6, 129, 130, 131; 427/127, 131, 162, 164, 407.1

[56] References Cited

U.S. PATENT DOCUMENTS

| | | | |
|---|---|---|---|
| 4,032,217 | 6/1977 | Coeuré et al. | 350/96.12 |
| 4,220,395 | 9/1980 | Wang et al. | 350/96.12 |
| 4,539,061 | 9/1985 | Sagiv | 427/407.1 |
| 4,732,783 | 3/1988 | Choe et al. | 427/164 |
| 4,778,236 | 10/1988 | Miyawaki | 350/96.13 X |
| 4,794,045 | 12/1988 | Robin et al. | 350/96.12 X |
| 4,859,013 | 8/1989 | Schmitt et al. | 350/96.12 |
| 4,970,120 | 11/1990 | Laschewsky et al. | 427/164 |

FOREIGN PATENT DOCUMENTS 1529374 10/1978 United Kingdom ............. 350/96.12

Primary Examiner—John D. Lee
Assistant Examiner—S. W. Barns
Attorney, Agent, or Firm—William L. Botjer

[57] ABSTRACT

Magneto-optical waveguide having a magneto-optical layer (5) applied on a substrate layer (4). An accurate phase match is provided at a compact structure in that a thin layer is applied in uniform thickness on the overall surface area of the magneto-optical layer (5), which thin layer consists of an optically transparent non-metallic material and whose refractive index is less than the refractive indices of the magneto-optical layer (5) and of the substrate layer (4), and whose thickness is less than 0.3 μm.

2 Claims, 1 Drawing Sheet

MAGNETO-OPTICAL WAVEGUIDE

BACKGROUND OF THE INVENTION

The invention relates to a magneto-optical waveguide having a magneto-optical layer applied on a substrate layer.

Such a waveguide is disclosed in the GB-A 1,529,374. More specifically when these waveguides are used for optical insulators and circulators, the problem is the matching of the propagation constants $\beta_{TE}$ and $\beta_{TM}$ of the TE-modes, or TM-modes, respectively, which can be fed into the waveguide. Its difference $\Delta\beta$ must have an accurately predetermined value to provide an adequate insulation. For the majority of applications $\Delta\beta$ must be equal to 0.

A desired value $\Delta\beta$ cannot be obtained with a sufficient accuracy when a magneto-optical layer is grown epitaxially. Layer deviations of less than 0.1 $\mu$m, which are caused by the tolerances, result already in unacceptable changes in the value of $\Delta\beta$. Consequently correction measures are necessary to accomplish a phase match. In the prior art a metal layer provided at some distance from the magneto-optical layer is used for that purpose. The accurately required setting of the distance causes difficulties.

As is disclosed in Opto Electr. Magazine 87, pp. 238–246, an anisotropic covering layer, consisting of vacuum-deposited strips in a grid pattern can be used for the face match. The production of this known covering layer is expensive. The strip period and the strip width can indeed theoretically be chosen such that, for example, a value $\Delta\beta=0$ is the result. In practice this ideal state aimed at cannot be obtained with a sufficient degree of certainty and accuracy. On the one hand a theoretic predetermination of the strip width and the strip period is comparatively uncertain and on the other hand the data obtained can significantly deviate because of unavoidable manufacturing tolerances of the desired value.

A method described in Proc. ECOC, Barcelona, 186, in which the setting of $\Delta\beta$ is possible by means of specific mechanical stresses applied from the exterior, requires expensive and bulky additional devices.

SUMMARY OF THE INVENTION

The invention has for its object to provide a waveguide of the type defined in the opening paragraph, which is of a compact structure and in which a desired value for $\Delta\beta$ can be accurately obtained in simple manner.

This object is achieved, in that the magneto-optical layer is coated over its full surface area with a correction-thin film of uniform thickness which consists of an optically transparent, non-metallic material whose index of refraction is lower than the index of refraction of the magneto-optical layer and of the substrate layer, and which is appreciably thinner than the magneto-optical layer and is less than 0.3 $\mu$m.

U.S. Pat. No. 3,830,555 teaches to apply on an magneto-optical layer an anisotropic double-refractive covering layer which must be thicker than the magneto-optical layer. This layer is then not a thin correction layer, but the known layer acts, as does also the substrate layer, instead of the ambient medium consisting of air, as an edge layer which bounds the magneto-optical layer and has a lower index of refraction.

According to the invention, a four-layer waveguide is obtained, in which between the edge layers which substantially act as infinitely thick layers, the substrate layer and the air layer a thin layer is additionally provided between the magneto-optical layer and the air layer in addition to the magneto-optical layer. Such a thin layer must optically have a low degree of attenuation and must be that thin that both this thin layer and the air layer provided thereon influence the field distribution in the magneto-optical layer. In the thin layer, as also in the air layer, the field strength must decrease in accordance with an e-function and not in accordance with a sign or cos-function, as in the actual magneto-optically conducting core layer.

The in all circumstances required value of the thickness of the thin layer depends on the physical and geometrical data of the magneto-optical layer and of course also on the index of refraction of the thin layer material and can theoretically be determined such that a desired change of the value $\Delta\beta$ is accomplished.

A location of the thin layer directly contiguous to the magneto-optical layer without the formation of an optically interfering boundary layer is already obtained by the van der Waals forces. It is possible, if so desired, to form chemical bridges between atoms of the thin layer and atoms of the magneto-optical layer. In addition, it can be advantageous to chemically link the molecules of the thin layer together.

In accordance with a particularly advantageous solution the thin layer consists of a plurality of individual coats. In this solution individual coats can be deposited gradually, until the desired value $\Delta\beta$ is measured. Each individual coat produces a very small $\Delta\beta$-jump, so that the target value can be controlled with utmost accuracy.

A preferred embodiment consists in that the thin layer consists of amphiphilic molecules, whose longitudinal axes are directed perpendicularly to the magneto-optical layer. Materials suitable for this purpose are, for example, arachic acid or also stearic acid. Then long-chained molecules are involved, one end of which has a polar and the other end an apolar behaviour.

An advantageous method of producing a magneto-optical waveguide, in which first a magneto-optical layer is deposited on a substrate layer, is characterized in that the magneto-optical layer is coated with a thin layer consisting of an optically transparent material whose index of refraction is less than the index of refraction of the magneto-optical layer and of the substrate layer, and whose thickness is determined such that the measured value of the difference $\Delta\beta$ of the propagation constants $\beta_{TM}$ of a transversal magnetic wave and $\beta_{TE}$ of a transversal electric wave have a predetermined value, more specifically $\Delta\beta=0$. Preferably, the thin layer is applied in the form of a plurality of individual layers and after one or more coating operations measurements are made to check the obtained value of $\Delta\beta$.

In accordance with a preferred solution, the individual coats are produced by the deposition of amphiphilic molecules in accordance with the Langmuir-Blodgett method. The Langmuir-Blodgett method, which is known per se, is described in greater detail in "Advances in Physics" 1985, pp. 475–512. In this method, individual layers are applied with a thickness equal to the length of the molecules of the amphiphilic materials. As a result thereof, very small thicknesses of the individual layers are obtained, which in appropriate numbers enable an extremely accurate control of the desired value of $\Delta\beta$.

In practice the magneto-optical layer is given in the manufacture a thickness which is less than the thickness required to achieve a desired value of $\Delta\beta$ in the absence of a thin layer. The magneto-optical layer is therefore first deliberately dimensioned such that its value is less than required without any thin layer, but is closest possible to this value. The missing thickness is filled up by the thin layer, which is produced by the consecutive deposition of individual layers, until the desired value of $\Delta\beta$ is obtained.

BRIEF DESCRIPTION OF THE DRAWING

The invention will now be described in greater detail by way of example with reference to the description of a preferred embodiment shown in the accompanying drawing.

DETAILED DESCRIPTION OF THE PREFERRED EMBODIMENTS

Figure 1:
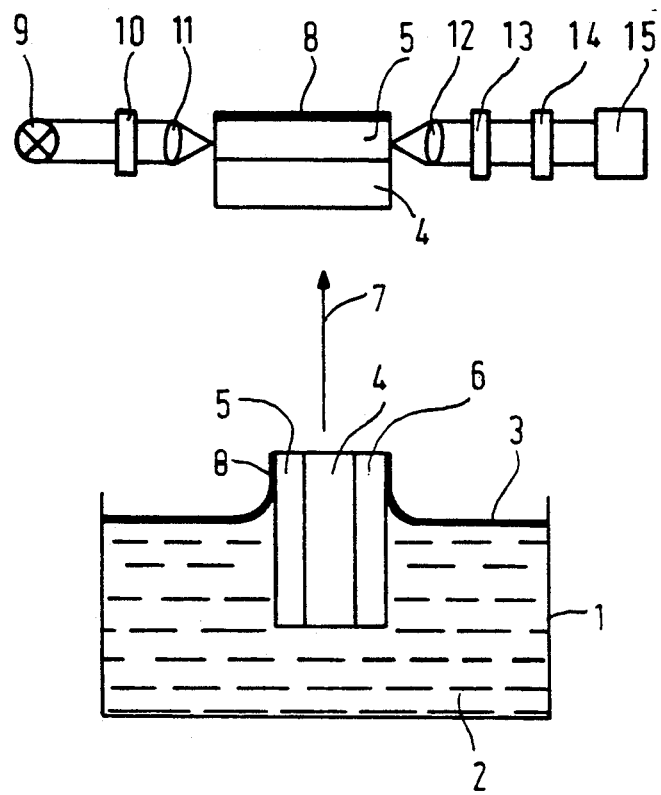
FIG. 1 shows schematically an arrangement for producing a waveguide according to the invention.

In the water 2 contained in the container 1 molecules of the arachic acid are grown and pushed together such that a dense single molecule layer 3 of upwardly directed arachic molecules is obtained, which have their polar end directed to the water surface. A waveguide preform consisting of a GGG substrate layer 4 and an epitaxially grown magneto-optical YIG layer 5 is immersed to under the water level. The terminal areas of the substrate layer 4, which are not to be coated, are covered by a cover layer 6. On withdrawal of the waveguide preform in the direction of the arrow 7, the molecules of the arachic acid are transferred to the magneto-optical layer 5 and adhere thereto by means of their polar ends. It is then of course obvious that, in known manner, devices, not shown, must be present to "corral" the arachic molecules on the water level.

After one or a plurality of the individual coats, applied in the described manner, the coated waveguide preform is pivoted in the above-shown position into the beam path of a measuring apparatus. The actual value obtained of $\Delta\beta$ is determined there and it is checked whether the target value $\Delta\beta=0$ has already been reached. This measurement is effected in known manner. Radiation emitted by a light source 9 is focused onto the face of the magneto-optical layer 5 via a polarizer 10 and a lens 11. Focusing ensures that the possible modes of the magneto-optical layer are excited. The emitted radiation is passed through a lens 12, through a rotatable compensator 13 and a rotatable polarizer 14.

The light intensity is measured by means of the optical detector 15 in two positions of the polarizer 10, which are shifted through 90° and correspond to the plane of polarization of the modes. When $\Delta\beta=0$ no elliptically polarized light may emit from the waveguide.

Should it appear that, after a coating sequence, the target value of $\Delta\beta$ for the value $\Delta\beta=0$, respectively, has not yet been reached, further coats can be applied in the manner described, until the target value of $\Delta\beta$ or $\Delta\beta=0$ is measured.

Finally a compact planar magneto-optical waveguide having an extremely accurate target value of $\Delta\beta$ is obtained. No cumbersome exterior adjusting devices are required for the use of the waveguide.

Figure 2:
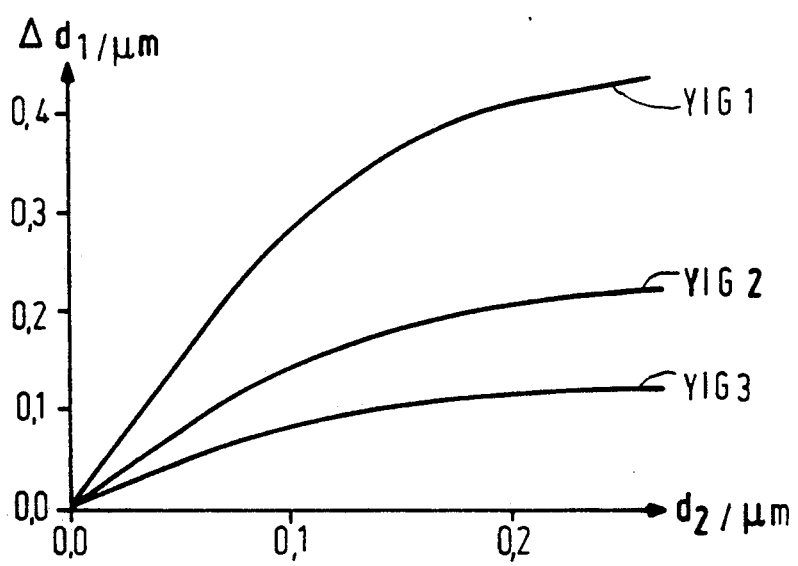
FIG. 2 shows for three different magneto-optical layer structures the relation between the thickness $d_2$ of the thin layer and the missing thickness $\Delta d_1$ of the magneto-optical layer, compensated thereby.

The thickness $d_2$ of the thin layer 8 to be deposited depends on what extent $\Delta d_1$ the magneto-optical layer 5 is too thin, relative to $d_2=0$. This correlation to obtain $\Delta\beta=0$ for a light wavelength $\lambda=1.3$ μm is shown in FIG. 2 for three different types of magneto-optical layer structures YIG1, YIG2 and YIG3. The refractive index of the substrate layer 4 is in all cases $n_s=1.95$ and the refractive index of the thin layer 8 is in all cases $n_d=1.5$ (always the same in all the three coordinate directions).

The refractive index of the magneto-optical layer in the direction of propagation of the light and perpendicularly thereto in the layer plane is in all three cases $n''_m=2.2$. In the orthogonal direction to the layer planes the refractive indices $n_m$ and the thicknesses $d_1$ hold for FIG. 2 in μm as follows:

for YIG: $n_m=2.20002$ $d_1=10.0-\Delta d_1$ for YIG2: $n_m=2.2002$ $d_1=4.5-\Delta d_1$ for YIG3: $n_m=2.202$ $d_1=2.0-\Delta d_1$.

I claim:

1. A method of producing a magneto-optical waveguide in which first a magneto-optical layer is deposited on a substrate layer, characterized in that the magneto-optical layer is coated with a thin layer of an optically transparent material, whose index of refraction is less that the index of refraction of the magneto-optical layer and of the substrate layer, and whose thickness is determined such that the measured value of the difference $\Delta\beta$ of the propagation of constants $\beta_{TE}$ of a transverse electric wave has a predetermined value, more specifically $\Delta\beta=0$, the thin layer being deposited in the form of a plurality of individual coatings, and that after at least one coating operations measurements are taken to check the values of $\Delta\beta$ obtained.

2. A method as claimed in claim 1, characterized in that the individual coats are produced by depositing amphiphilic molecules in accordance with the Langmuir-Blodgett method.

* * * * *